United States Patent
DeLuca et al.

(10) Patent No.: US 9,736,636 B1
(45) Date of Patent: Aug. 15, 2017

(54) GEOFENCE PRIORITIZATION

(71) Applicant: INTERNATIONAL BUSINESS MACHINES CORPORATION, Armonk, NY (US)

(72) Inventors: Lisa Seacat DeLuca, Baltimore, MD (US); Jeremy A. Greenberger, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/337,375

(22) Filed: Oct. 28, 2016

(51) Int. Cl.
*H04W 24/00* (2009.01)
*H04W 4/02* (2009.01)

(52) U.S. Cl.
CPC .......... *H04W 4/021* (2013.01); *H04W 4/023* (2013.01)

(58) Field of Classification Search
CPC .................................................... H04W 4/021
USPC ........................................................ 455/566
See application file for complete search history.

(56) References Cited

U.S. PATENT DOCUMENTS

| | | | |
|---|---|---|---|
| 8,812,027 B2 | 8/2014 | Obermeyer et al. | |
| 9,043,329 B1 * | 5/2015 | Patton ................. | G06F 17/3087 707/740 |
| 9,060,248 B1 | 6/2015 | Coulombe et al. | |
| 9,100,795 B2 | 8/2015 | Sartipi et al. | |
| 9,226,105 B2 | 12/2015 | Turgman et al. | |
| 2009/0164118 A1 | 6/2009 | Breen | |
| 2013/0045760 A1 | 2/2013 | Obermeyer et al. | |
| 2013/0332274 A1 | 12/2013 | Faith et al. | |
| 2014/0057648 A1 | 2/2014 | Lyman et al. | |
| 2014/0155094 A1 | 6/2014 | Zises | |
| 2014/0162692 A1 | 6/2014 | Li et al. | |
| 2014/0164118 A1 | 6/2014 | Polachi | |
| 2014/0337123 A1 | 11/2014 | Nuernberg et al. | |
| 2014/0379430 A1 | 12/2014 | Kritt et al. | |
| 2015/0011237 A1 | 1/2015 | Obermeyer et al. | |
| 2015/0199704 A1 | 7/2015 | Gottesman et al. | |
| 2015/0269167 A1 | 9/2015 | Tseng | |
| 2015/0269624 A1 | 9/2015 | Cheng et al. | |

(Continued)

OTHER PUBLICATIONS

Levent Besik and Alessio Pace, Systems and Methods of Managing Geofences, Technical Disclosure Commons, Apr. 22, 2016, pp. 10.

(Continued)

*Primary Examiner* — Charles Shedrick
(74) *Attorney, Agent, or Firm* — Schmeiser, Olsen & Watts; Isaac J. Gooshaw

(57) ABSTRACT

Systems, methods and tools for prioritizing the transmission of geofences based on the social influences and interactions with the geofences previously performed or discussed by associates of a user. Embodiments may search a user's social media connections and friend's lists for associates of the user that may have interacted with, commented about or used one or more of the geofences. As a function of the social influences of the user's associates, the disclosed systems, methods and tools may calculate a rating for each geofence based on the popularity of the geofence or probability that the user may enjoy interacting with the geofence. Embodiments may prioritize the transmission of the geofences being downloaded to the user's client device as a function of the ratings assigned, therefore downloading and displaying the most popular geofences and/or the geofences most likely to appeal to the user first.

20 Claims, 9 Drawing Sheets

(56) References Cited

U.S. PATENT DOCUMENTS

| | | |
|---|---|---|
| 2015/0271638 A1 | 9/2015 | Menayas et al. |
| 2015/0341747 A1 | 11/2015 | Barrand et al. |
| 2015/0365796 A1* | 12/2015 | Toni .................... H04W 4/022 |
| | | 701/522 |
| 2016/0007151 A1 | 1/2016 | Birch et al. |
| 2016/0057573 A1 | 2/2016 | Chang et al. |
| 2016/0057576 A1* | 2/2016 | Kessler ................ H04W 12/04 |
| | | 455/411 |
| 2016/0061609 A1* | 3/2016 | Dickey ................. G01C 21/26 |
| | | 701/400 |
| 2016/0080486 A1 | 3/2016 | Ram et al. |
| 2016/0183052 A1 | 6/2016 | Qiu |

OTHER PUBLICATIONS

Friedman, Jack P.; List of IBM Patents or Patent Applications Treated as Related; Oct. 28, 2016; 1 page.

Bareth, Ulrich et al.; geoXmart—A Marketplace for Geofence-Based Mobile Services; 2010 34th Annual IEEE Computer Software and Applications Conference; Jul. 19-23, 2010; pp. 101-106.

Friedman, Jack P.; Updated List of IBM Patents or Patent Applications Treated as Related; Feb. 1, 2017; 1 page.

Friedman, Jack P.; Updated/Corrected List of IBM Patents or Patent Applications Treated as Related; Dec. 29, 2016; 1 page.

* cited by examiner

GEOFENCE PRIORITIZATION

TECHNICAL FIELD

The present disclosure relates generally to systems, methods and tools for creating, displaying and prioritizing geofences.

BACKGROUND

As portable devices, such as mobile communication systems, smart phones, tablet computers, laptops and navigation devices, become more advanced and powerful, these portable devices increasingly provide locational guidance to users in real time. More recently, portable devices have introduced a concept known as geo-fencing. A geofence is a virtual perimeter around a real-world location. Portable devices that implement geo-fencing functionalities may alert the user when the portable device has entered or exited an established geofence.

A geofence may be a circular or polygon defined area around a point on a map that is often defined by the areas latitude and longitude. Programs that incorporate geo-fencing allow an administrator of a geofence to set up triggers so when a device enters (or exits) the boundaries of the geofence (defined by the administrator), a text message or email alert is sent. Many geo-fencing applications incorporate Google® Earth, allowing administrators to define boundaries on top of a satellite view of a specific geographical area. Developers define geofences to enhance their mobile applications such as knowing when to push a notification to a customer when they are near the store, or to track individuals such as turning on the lights in their house when someone is almost home. Unfortunately, the platforms have limitations on the number of geofences that can be monitored. Currently android is set to 100 geofences and iOS has a 20 geofence limitation. In situations where more geofences must be monitored than the platform can handle, it is up to the developers to determine which geofences are returned. Often this means returning only those geofences within the closest distance to the customer in combination with an expensive API call periodically to check if a big location change has occurred.

SUMMARY

A first embodiment of the present disclosure provides a method for prioritizing transmission of a geofence comprising the steps of: querying, by a processor of a computer system, a list of each available geofence; retrieving, by the processor, historical data from one or more data sources; analyzing, by the processor, the historical data describing previous interactions between associates of the user and each of the available geofences; populating, by the processor, a prioritized list of geofences, wherein each of the geofences in the prioritized list are assigned a rating as a function of the historical data and each of the geofences are organized by rating; and transmitting, by the processor, each of the geofences in order by rating to the client device up to a maximum number of allowable geofences permitted by the client device.

A second embodiment of the present disclosure provides a computer system, comprising: a central processing unit (CPU); a memory device coupled to the CPU; and a computer readable storage device coupled to the processor, wherein the storage device contains program code executable by the CPU via the memory device to implement a method for prioritizing transmission of a geofence comprising the steps of: querying, by the CPU, a list of each available; retrieving, by the CPU, historical data from one or more data sources; analyzing, by the CPU, the historical data describing previous interactions between associates of the user and each of the available geofences; populating, by the CPU, a prioritized list of geofences, wherein each of the geofences in the prioritized list are assigned a rating as a function of the historical data and each of the geofences are organized by rating; and transmitting, by the CPU, each of the geofences in order by rating to the client device up to a maximum number of allowable geofences permitted by the client device.

A third embodiment of the present disclosure provides a computer program product comprising: one or more computer readable hardware storage devices having computer readable program code stored therein, said program code containing instructions executable by the one or more central processing units (CPU) to implement a method for prioritizing transmission of a geofence comprising the steps of: querying, by the CPU, a list of each available geofence as a function of location data retrieved from a client device operated by a user; retrieving, by the CPU, historical data from one or more data sources; analyzing, by the CPU, the historical data describing previous interactions between associates of the user and each of the available geofences; populating, by the CPU, a prioritized list of geofences, wherein each of the geofences in the prioritized list are assigned a rating as a function of the historical data and each of the geofences are organized by rating; and transmitting, by the CPU, each of the geofences in order by rating to the client device up to a maximum number of allowable geofences permitted by the client device.

DETAILED DESCRIPTION

Overview

Figure 1:
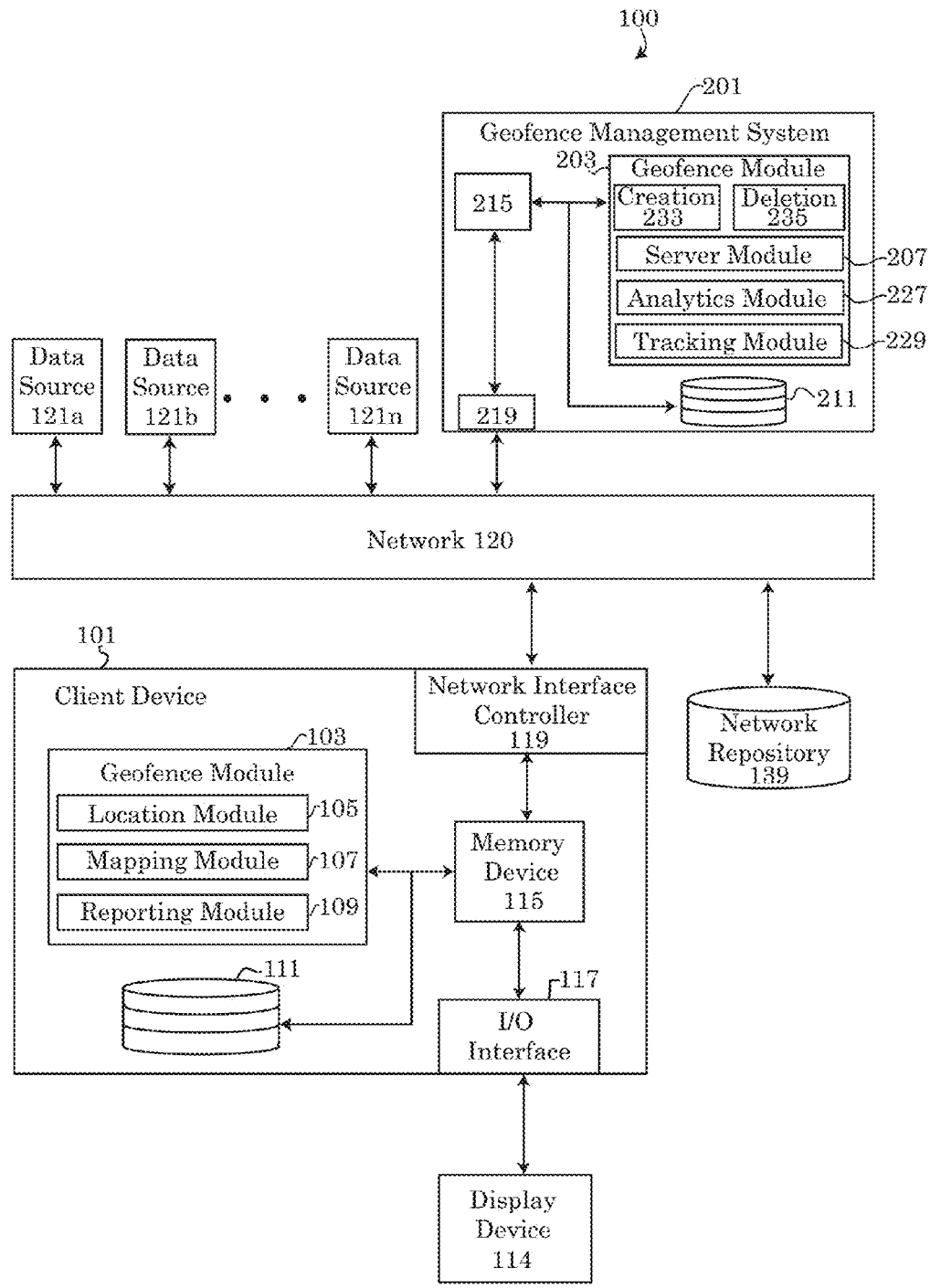
FIG. 1 depicts a schematic view of embodiment of a system for prioritizing transmission of a geofence consistent with the embodiments of the present disclosure.
Figure 2:
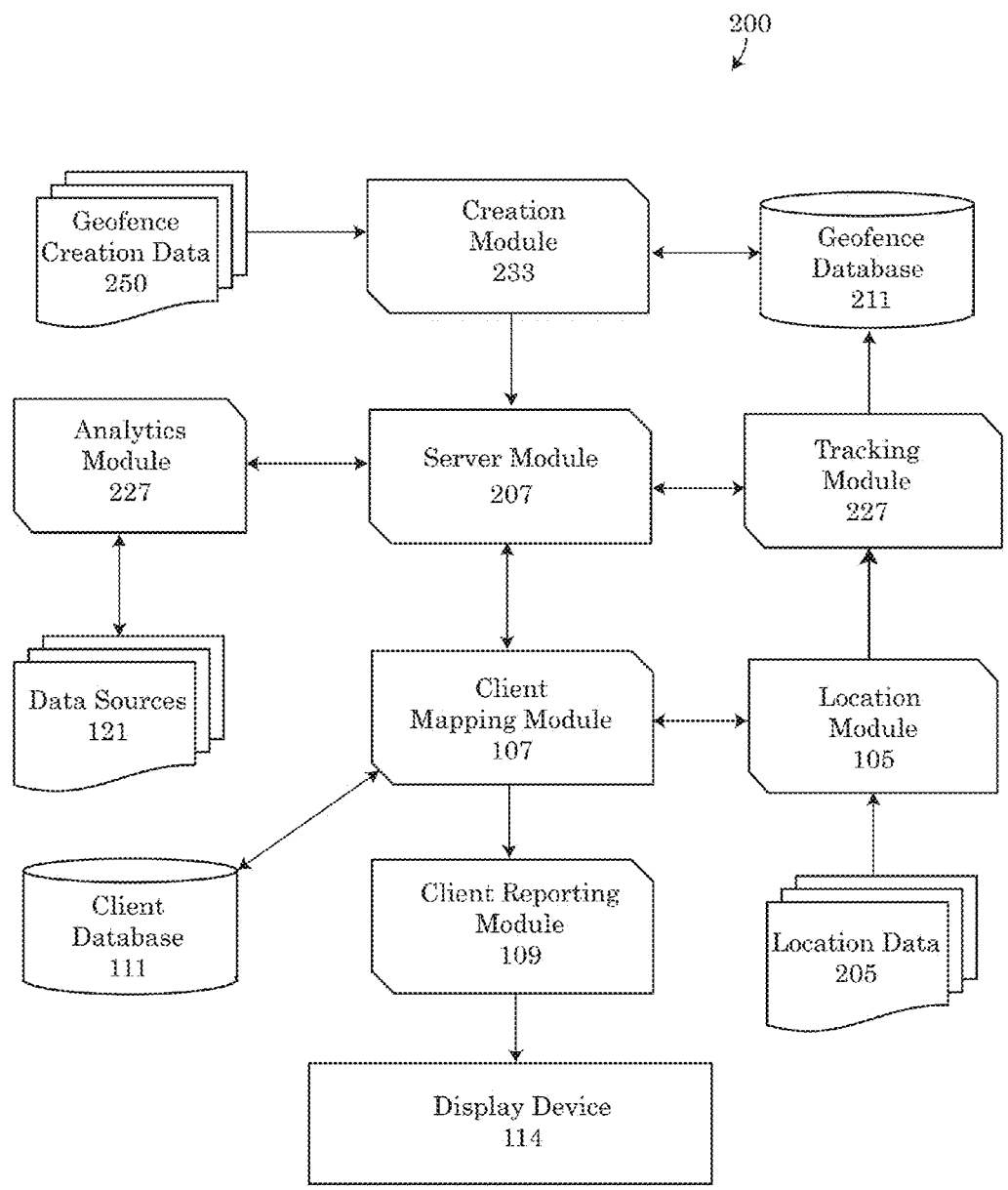
FIG. 2 depicts a flow chart describing the system for prioritizing transmission of a geofence.
Figure 3:
FIG. 3 illustrates an embodiment of geo-fencing module displaying a mapping interface.

Embodiments of the present disclosure recognize that currently available geofence systems and client devices retrieving geofences may be limited to a preset number of geofences that may be loaded into the client device and/or displayed by the device. Client devices, such as mobile computing systems operating on the Android operating system may be limited to retrieving and storing 100 simultaneous geofences. Likewise, mobile computing devices equipped with an iOS operating system may be limited to merely 20 simultaneous geofences stored or accessible by the computing device. Often, the number of geofences available for retrieval and download onto the client device in a current location may exceed the maximum number of geofences that can be simultaneously stored and displayed by the client device. Accordingly, because of the limitations on the number of geofences by the operating systems of client devices, there is a need to prioritize the order in which active geofences are distributed and transmitted to the client device of a user. Prioritizing the order active geofences are retrieved by the client device may ensure that the geofences retrieved and displayed are most likely to be geofences that are interesting to a user of the client device and geofences that have the highest probability of being visited by the user. Likewise excluding unwanted or non-relevant geofences from being downloaded and occupying one of the limited number of allowable geofences.

Embodiments of the system for prioritizing the transmission of geofences improve upon currently available geofence systems by retrieving and downloading geofences from a geofence management systems (such as a server or other computing system) based on the social influences, rather than the current systems that may organize the retrieval randomly or based on proximity. Embodiments of the system and method of the current application may collect historical data by scanning, retrieving and analyzing patterns in the user's behavior, browsing history, emails, messaging services and social media influences of friends, family, relatives, co-workers, etc. to organize the available geofences into an order of likelihood that the user would enjoy interacting with the geofence and receiving the accompanying geofence notifications.

In some embodiments, the geofence system may search a user's social media connections and friend's lists for associates of the user that may have interacted with or used one or more of the geofences available to the user through the geofence system. The geofence system may search and collect historical data from associates of the user and may focus the search toward the associate's interactions with or comments about any of the available geofences. The search and collection of historical data may include details about associates entering, exiting or dwelling within available geofences, comments or messages about the available geofences, and recommendations or reviews by associates of the user, encouraging or discouraging others to visit or partake in interacting with the geofences. In some embodiments, the collection of historical data may not only be searched and analyzed for associated interaction or discussion about the available geofence, the historical data may be further analyzed for interactions and discussions about locations, landmarks which may be within the virtual boundaries of the available geofences and keywords that may be affiliated with the geofence.

Embodiments of the geofence system may, as a function of the analysis of the historical data of user's associates, calculate a rating for each geofence based on the popularity of the geofence, according to the data sources containing information about the user's associates in some embodiments. In other embodiments, the ratings may indicate a calculated probability that the user may enjoy interacting with the geofence based on the reactions, responses and amount of feedback from the user's associates. The geofence system may prioritize the transmission of the geofences being downloaded to the user's client device as a function of the ratings assigned, therefore downloading and displaying the most popular geofences and/or the geofences most likely to appeal to the user. Accordingly, should the user reach the maximum allotment of simultaneous geofences available on the client device, the geofence system has provided the most popular and predictively the most appealing geofences to the user first, therefore decreasing the likelihood that an appealing geofence has not be retrieved once the maximum allotment has been reached.

System for Prioritizing the Transmission of Geofences

Although certain embodiments are shown and described in detail, it should be understood that various changes and modifications may be made without departing from the scope of the claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Figure 9:
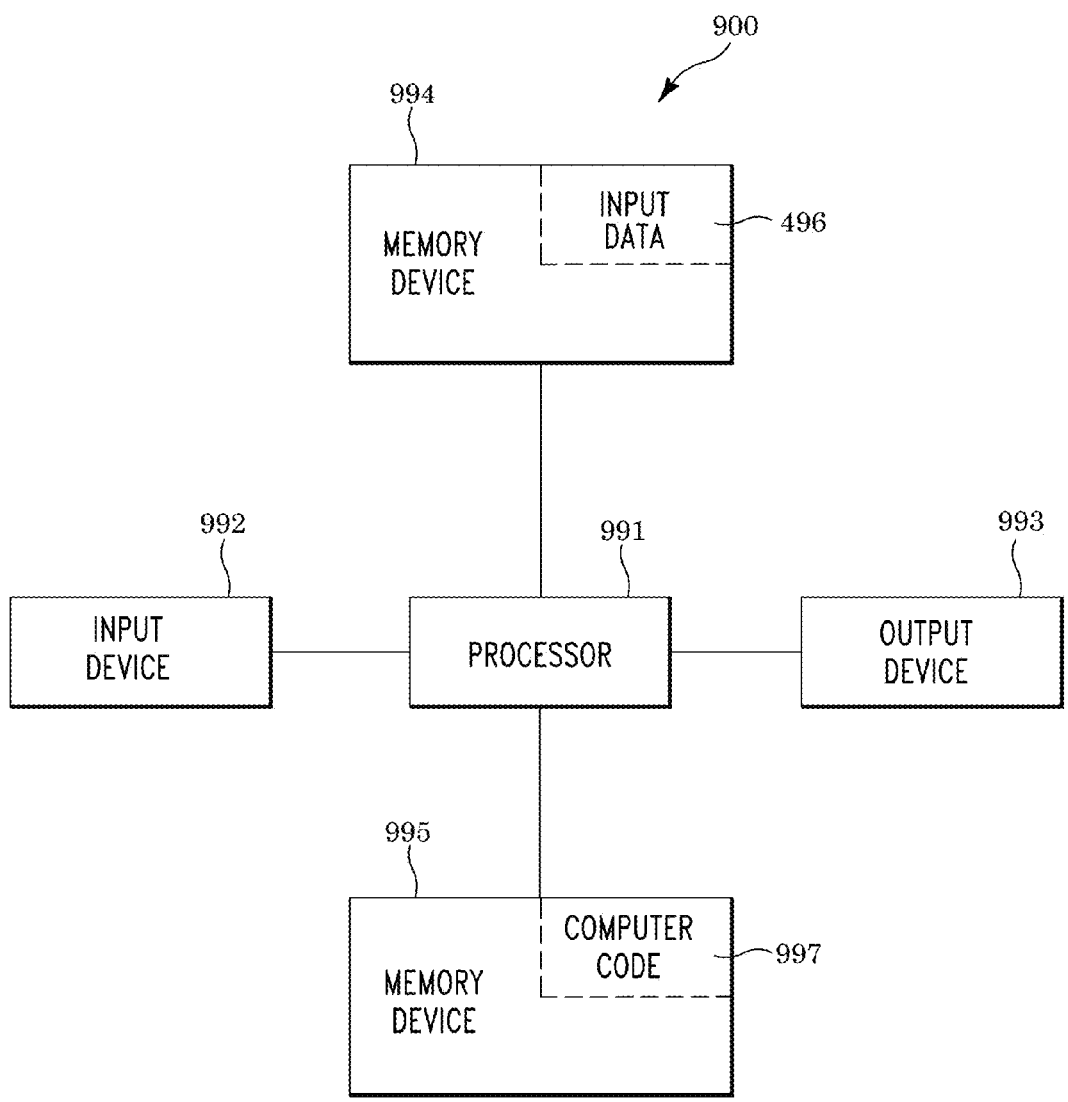
FIG. 9 depicts a block diagram of an embodiment of a generic computer system capable of implementing prioritizing transmission of a geofence consistent with the embodiments described in this application.

Referring to the drawings, FIG. 1 depicts a block diagram of a socially influenced geofence system 100 (hereinafter "geofence system 100") capable of prioritizing the transmission of the geofences available to a user of the geofence system 100. Embodiments of the geofence system 100 may include a plurality of one or more computer systems, including a client device 101 and a geofence management system 201. The computer systems 101, 201 may each be a specialized computer system, having specialized configurations of hardware, software or combinations thereof as depicted in FIGS. 1-7 of the present disclosure and in the embodiments described herein. Embodiments of the computer systems 101, 201 may not only comprise the elements of the systems and devices 101, 201 depicted in FIG. 1-7, but may also incorporate one or more elements of a generic computer system as shown in FIG. 9 and described in detail below. Elements of the generic computer system of FIG. 9 may be integrated into the specialized computer systems 101, 201 of FIGS. 1-7.

Each of the computer systems 101, 201 may be connected and placed in communication with one another over a computer network 120. Embodiments of the network 120 may be constructed using wired or wireless connections between each hardware component connected to the network 120. As shown in the exemplary embodiments, each of the computer systems 101, 201 may connect to the network 120 and communicate over the network using a network interface controller (NIC) 119, 219 or other network communication hardware and/or virtualization software. Embodiments of the NICs 119, 219 may implement specialized electronic circuitry allowing for communication using a specific physical layer and a data link layer standard. Examples of the data link layer may include Ethernet, Fiber channel, Wi-Fi or Token Ring. The NIC 119, 219 may further allow for a full network protocol stack, enabling communication over network 120 to the group of computer systems 101, 201 or other computing hardware devices linked together through communication channels. The network 120 may facilitate communication and resource sharing among the computer systems 101, 201 and additional hardware devices connected to the network 120, for example computer systems storing the data sources 121*a*, 121*b* . . . 121*n* and network repository 139. Examples of network 120 may include a local area network (LAN), home area network (HAN), wide area network (WAN), back bone networks (BBN), peer to peer networks (P2P), campus networks, enterprise networks, the Internet, cloud computing networks and any other network known by a person skilled in the art.

As shown in FIG. 1, embodiments of the geofence system 100 may include a computing system which may be described as a geofence management system 201. The geofence management system 201 may perform the tasks and functions of creating, deleting, distributing and tracking each of the geofences created by the geofence management system 201. Embodiments of the geofence management system 201 may further collect historical data about the user from each client device 101 connecting to the geofence management system 201 and historical data from one or more data sources 121*a*, 121*b* . . . 121*n* (hereinafter referred to collectively as "data sources 121") accessible over the network 120. Embodiments of historical data may be analyzed for references, reviews and interactions with the available geofences by users associated with the user of the client device (referred to as associates of the user), including a sentiment analysis of messages by associates for keywords, location tags and timestamps that match geofence triggers performed by the associate of the user. The geofence management system may prioritize the order of transmission for each of the geofences created and distributed as a function of the geofence's popularity or likeability amongst associates of the user. The geofence management system 201 may associate ratings with each of the geofences and organize, transmit and distribute geofences as a function of the ratings, wherein the highest rated geofences may be transmitted before lower rated geofences.

Embodiments of the geofence management system 201 may include a geofence module 203 capable of implementing and performing the tasks and functions of the geofence management system 201. The term "module" may refer to a hardware based module, software based module, or a module may be a combination of hardware and software resources. A module (whether hardware, software, or a combination thereof) may be designed to implement or execute one or more particular functions, tasks or routines of the systems. Embodiments of hardware based modules may include self-contained components such as chipsets, specialized circuitry and one or more memory devices. A software-based module may be part of a program code or linked to program code containing specific programmed instructions loaded in the memory device 115, 215 of the specialized computer systems 101, 201 of the geofence system 100.

Embodiments of the geofence module 203, whether hardware, software or a combination thereof, may perform the functions and tasks associated with creating geofences, deleting geofences, transmitting geofences and geofence related messages to client devices 101, prioritizing geofences and tracking the geofence and client device 101 interactions. Embodiments of the geofence module 203 may include sub-modules designated or assigned to perform the individual tasks, routines and services of the geofence module 203. Various embodiments of the geofence module 203 may comprise a creation module 233, analytics module 227, server module 207, tracking module 229 and deletion module 235.

Embodiments of the creation module 233 may perform the task of generating the geofence in accordance with the geofence creation data 250 inputted by an administrator or creator of a geofence. The creation module 233 may receive the configuration settings as input data for each geofence as described by the administrators or creators. Embodiments of the creation module 233 may define the properties of each geofence and build each geofence in accordance with the geofence creator or administrator's defined properties. Examples of geofence properties may be defined during the geofence creation process may include the geofence name, location of the geofence (e.g. coordinates such as latitude and longitude), size (e.g. radius) of the geofence, shape of the geofence, geofence duration (e.g. start time/date and end time/date), geofence repeatability or schedule for repeating the geofence, geofence transitions (e.g. enter, exit, dwell), and notifications that may be displayed by the geofence once a transition is fulfilled. In some embodiments, the creation module 233 may tag each geofence with keywords or metadata describing the geofence, its location and any landmarks that may be associated with the location.

Embodiments of the creation module 233 may save and store the generated geofence, keywords and the accompanying geofence properties to a data storage device such as memory device 215, a localized geofence management database 211 or a network accessible data storage device such as network database, repository 139, data mart or other data structure. Saving and storing each of the created geofences, the geofence configuration settings and properties may, in some embodiments, allow for the geofence management system 201 to perform a query of the available geofences and continuously track, organize and update the geofences' properties. In some embodiments, the storing the geofences may allow the system 100 to repeatedly create the same geofences periodically, as instructed by geofence's creator or administrator. For example, a particular geofence may occur for a predetermined duration and then repeatedly be created every day, week, month, year, etc. The computer system accessed by the creator or administrator may send an API call to execute a geofence by a particular geofence name. In response, the creation module 233 may query or lookup the geofence management database 211 and load the previously stored configuration settings and parameters into memory device 215 and update the database entry to include a newly scheduled starting date, duration and expiration date.

Embodiments of the geofence module 203 may organize and prioritize the transmission of each of the available geofences created by the creation module 233 on a user by user basis in order to customize the number and type of geofences delivered to the client device 101 from the geofence management system 201. In order to organize and prioritize the transmission of the geofences to the client device 101, some embodiments of the geofence module 203 may include an analytics module 227. The analytics module 227 may be responsible for identifying geofences that may be more popular amongst associates of the user or more relevant to a user's interests. Embodiments of the analytics module 227 may prioritize and evaluate the popularity and relevance of each of the available geofences by collecting historical data and comparing the historical data with each of the available geofences. Embodiments of the historical data may be collected from user's client device and one or more separate data sources 121 available to the geofence management system 201 over the network 120.

Embodiments, the analytics module 227 may characterize, rate and prioritize geofences as a function of the historical data by searching or scanning the historical data for data relevant to each of the geofences and comparing the data to the stored geofences. The geofence module 203 may receive permissions from the client device 201 to search or scan the historical data of the user's client device and social media connections for data relevant to the geofence from users and associates of the user. For example, the analytics module may search through browser histories, search engine histories, social media data including social media websites and applications (social media data), email data, direct messaging data, short message service (SMS) data, voice data, video data, keystrokes, mouse movements, eye movement data or facial recognition data that may identify a reaction of the user or associates of the user's toward a particular geofence. The analytics module 227 may correlate the historical data collected with one or more particular geofences, geofence keywords and metadata in order to identify geofences that may be more popular or relevant toward the user's interests.

For example, in some embodiments, the analytics module 227 may identify from the historical data that one or more associates of the user may have visited a particular geofence, dwelled within a particular geofence for an extended period time, expressed satisfaction (or dissatisfaction) with the geofence, tagged a geofence or geofence location in a message, used keywords identifying a geofence or a landmark near a geofence. The analytics module 227 may recognize patterns in messages or keywords and determine the number of associates that have engaged with using a particular geofence based on the context of the collected historical data. The analytics module 227 may draw the conclusions based on the actual data or contextual data about each associate of the user to gauge the popularity and relevance of each geofence. In particular, a geofence or geofence location that has generated more discussion, likes, reviews, recommendations and references within the historical data may be rated as being more popular and/or more likely to relevant or enjoyed by the user. Likewise, geofences that are referenced, discussed, rated, liked, shared, etc. less may be considered to be less popular, less relevant or less likely by the analytics module 227 to be enjoyed by the user. Based on the analytics module's 227 calculations, comparisons and conclusions drawn as a function of the historical data, geofence keywords and geofence metadata, the analytics module 227 may populate a prioritized list of geofences which may be organized by rating, relevance or likelihood of interest to the user. Table 1 below provides an example of a portion of a prioritized list of geofences by rating.

TABLE 1

| # | Geofence Name | Rating % | Associates identified |
|---|---|---|---|
| 1 | Museum of Modern Art (MOMA) | 90% | Dave, Ken, Steve, Matt, Lisa, Christine, Allison, Rod |
| 2 | Central Park Zoo | 85% | Bill, Kathy, Steve, Angela, Ken |
| 3 | Rockefeller Center | 77% | Dave, Angela, Lisa, Chris |
| 4 | Statue of Liberty | 70% | Allison, Rod, Chris |
| 5 | Empire State Building | 60% | Peter, Dave |
| 6 | Whitney Museum | 55% | Matt, Allison |
| ... | | | |
| 20 | Battery Park | 35% | Christine |

TABLE 1-continued

In some embodiments, the analytics module 227 may weigh the opinions and actions of certain associates more highly than others. For example, based on the interactions and relationships between the user and the associate of the user, the analytics module 227 may create a hierarchy of associates whose interactions with a particular geofence may be more relevant or more meaningful to the user. For instance, associates identified as parents, siblings, relatives, children and close friends, may be weighted more heavily when prioritizing the most relevant and popular geofences to transmit to the user's client device 101 than mere acquaintances, classmates, co-workers, distant relatives, or friends of associates. Determining the hierarchy may include evaluating the amount of interaction between the associate and the user, the length of the interaction and the quality of the interactions.

Embodiments of the geofence management system 201, may further comprise a server module 207. The server module 207 may perform the tasks of loading one or more geofences created by the creation module 233 into the memory device 215 of the geofence management system 101 and transmit the geofences over the network 120 to each client device 101. Client devices 101 connecting to the geofence management system 201 may retrieve, store, download or actively stream the geofence data over network 120 from the server module 207. In some embodiments, the server module 207 may be provided a list or database entry describing the order in which the one or more geofences may be transmitted to the client device 101, such as the database entry shown in Table 1 above. The server module may query the list of geofences organized by the analytics module 227 that may be saved to the geofence database 211. When a request is made by the client device 101 to deliver geofences to the client device 101, the server module 207 may load the list of the most relevant, popular or most likely geofences to be of interest to the user. The server module 207 may transmit each of geofences in the order prescribed by the prioritized list of geofences. In some embodiments, the server module may continue to transmit the geofences to the client device, until the server module 207 is notified by the client device 101 that the client device 101 cannot display additional geofences.

Embodiments of geofence module 203 may further comprise a tracking module 229, the tracking module 222 may collect location data 205 from location module 105, generate statistics about the geofence, identify the number transitions activated by client device 101 for each geofence and the number of notifications transmitted to client devices entering each geofence. The tracking module 229 may identify conditions giving rise to the transmission of the geofence's associated notifications, including the identification of client devices meeting the transitions requirements (enter, exit, dwell) configured by creation module 233 to trigger a geofence event of the created geofence. As a client device 101 receiving the geofence impinges on a virtual boundary of the geofence mapped by the mapping module 107 of the client device, or dwells within the virtual boundaries of the geofence, the tracking module 229 may identify the triggering transition and transmit the associated notification resulting from transition's occurrence, including the transmission of push notifications to the client devices 101.

The deletion module 235 of the geofence module 203 may perform the function or task of deactivating, deleting or removing expired geofences from the geofence database. In some embodiments, the deletion module may update the prioritized list of geofences and remove one or more expired or inactive geofences from the list, which may allow for the next available geofence from the prioritized list to be transmitted by the server module 207 to the client device 101.

In some embodiments of the geofence system 100, the system 100 may include one or more client devices 101 which may be capable of connecting to the geofence management system 201 via the computer network 120. The tracked device 101 may be any type of mobile computing device that may move or change locations. Some examples of a client device 101 may include, but are not limited to mobile communication devices, smart phones, cell phones, laptops, tablet computers, smart watches and glasses, persona data assistants (PDA) and wireless or internet enabled media devices. The client device 101 may be any type of touch point device capable of acting as a point of interaction with the geofence created by the geofence management system 101. The client devices 101 are not limited only to the number of devices depicted in the figures of the current application. Any number of a plurality of client devices 101 may part of the geofence system 100 and connected to network 120.

Embodiments of the client device 101 may include a geofence module 103. The geofence module 103 may provide access and interaction with the geofences of the geofence management system 201 as well as map each of the geofences retrieved from the geofence management system 201. The geofence module 103 may be constructed out of specialized hardware physically connected to the client device or the geofence module 103 may be a software program comprising program instructions loaded in the memory device 115 of the client device 101. In alternative embodiments, the geofence module 103 providing access to the geofences and geofence notifications, may be virtualized hardware that may be physically located elsewhere on the network 120 and/or a remotely accessible program executing program instructions for transmitting, receiving and displaying the data of the geofences. For example, the client device 101 may be accessing a virtualized geofence module 101 through program or application services maintained by a cloud computing network.

In some embodiments of the geofence module 103, the client device 101 may include a location module 105. The location module 105 may be comprised of hardware and/or software capable of utilizing a positioning system to pinpoint the current location of the client device 101 and/or previous positions of the client device 101 that may be stored in the memory device 115 or database 111. For example the location module may utilize the positioning capabilities of the global positioning system (GPS), Wi-Fi, Bluetooth of Bluetooth low energy beacons, cell tower triangulation or a combination of positional systems. In some embodiments, the location module 105 may include a transmitter, receiver and/or transceiver for receiving location data from a positioning system or broadcasting the location data to the geofence management system 201. Embodiments of the location module 105 may save, store and update one or more sets of location data to a memory device onboard the location module 105, the location module 105 may store the location information to memory device 115 or in some embodiments to database 111.

Embodiments of the location module 105 may communicate the stored location data 205 to the geofence management system 201 in order to allow the geofence management system 201 to track the location of the client device 101, compare the location information with the geofences retrieved from the server module 207 and assess whether the client device of the user is entering, exiting or dwelling within the established geofence in order for the geofence management system to push geofence notifications to the client device 101 upon triggering the transitioning conditions of one or more geofences.

Embodiments of the client device 101 may further comprise a mapping module 107. The mapping module 107 may perform he function of pinpointing the current location of the client device 101, monitor the position of the client device 101 in real time as the tracked device changes location and display the location of the tracked device 101 in relation to the position of each geofence retrieved from the geofence management system 201. Embodiments of the mapping module 107 may receive the data of the geofence from the geofence module 103 of the geofence management system 301. In particular, the mapping module 107 may download or retrieve geofence data from the server module 107 based on the prioritization, ratings and/or popularity of the geofences in relation to the user's interests and the historical data of the associates of the user.

Embodiments of the client device's 101 mapping module 107 may plot each of the geofences as a function of the geofence data onto a mapping interface 302 which may be displayed by a display device 114 of the client device 101. As shown by the Example in FIG. 3, the mapping module 107 may display the device location 304 onto a map interface 302 as a function of the location data 205 collected by the location module 105. In some embodiments, the device location 304 may be displayed in real time. The map interface 302 may depict the location surrounding the client device's current device location 304. As the client device 101 updates the location information of the location module 105, the device location 304 may be mapped onto the mapping interface 302 accordingly.

Figure 4:
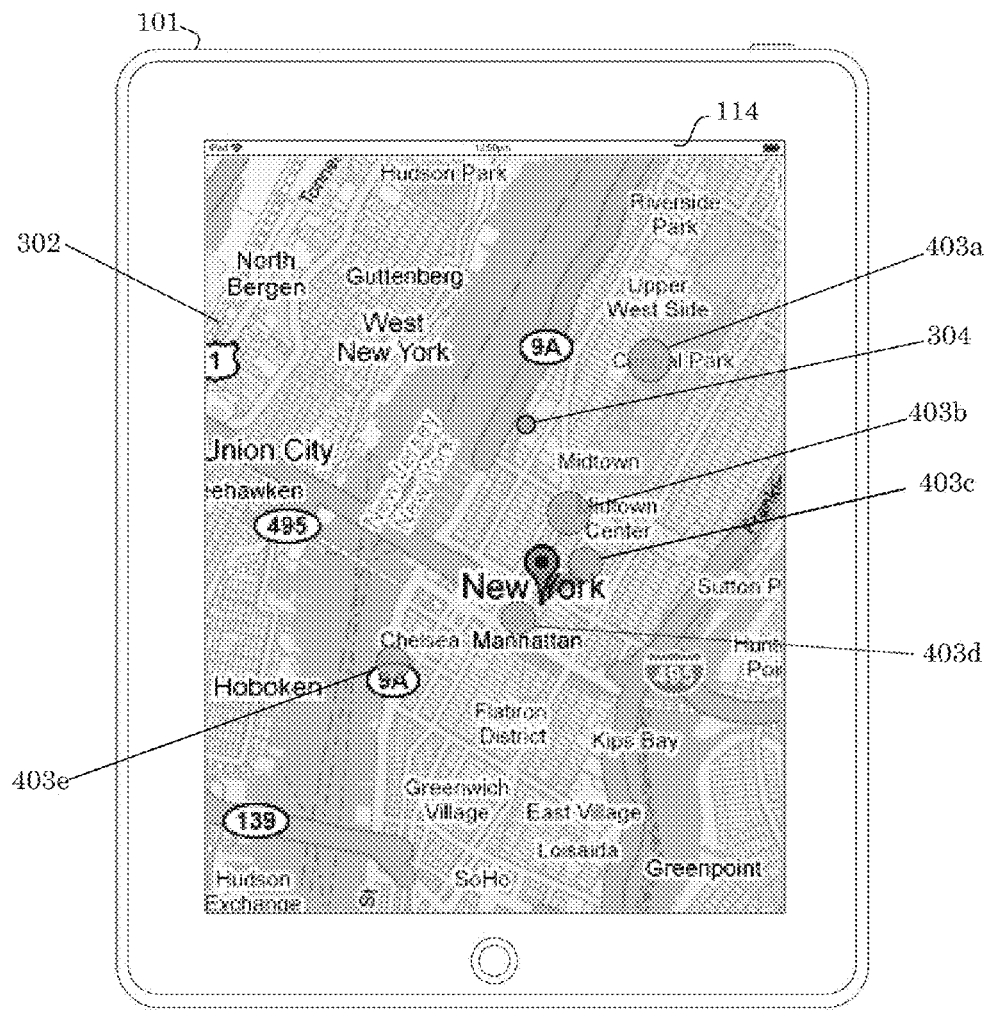
FIG. 4 illustrates an embodiment of the mapping interface of FIG. 3 displaying embodiment of active geofences.

As shown in FIG. 4, the mapping module 107 may plot each of the geofence events surrounded by the accompanying geofence boundaries 403a, 403b, 403c, 403d, 403e (hereinafter referred to collectively as "geofences 403") depicted on the mapping interface 302. The locations of each of the geofences 403 and the size of the geofences 403 may be defined by the configuration provided by the geofence creation data 250 to the creation module 233 during the generation of each of the geofences 403. Each of the geofences 403 may be tied to a region, store, public location, live event occurring in real time, landmark or any other type of event. The timing of the geofences 403 may be predetermined and/or timed to a specific start date/times and end date/times of a particular events real time length and/or may appear or disappear from the map interface 302 as the analytics module 227 reprioritizes the most popular or relevant geofences based on updated historical data retrieved from the data sources. As the prioritized list of geofences updates, the server module 207 may transmit the updated geofences over network 120 to the mapping module 107 plotting each geofence onto the map interface 302.

Figure 5:
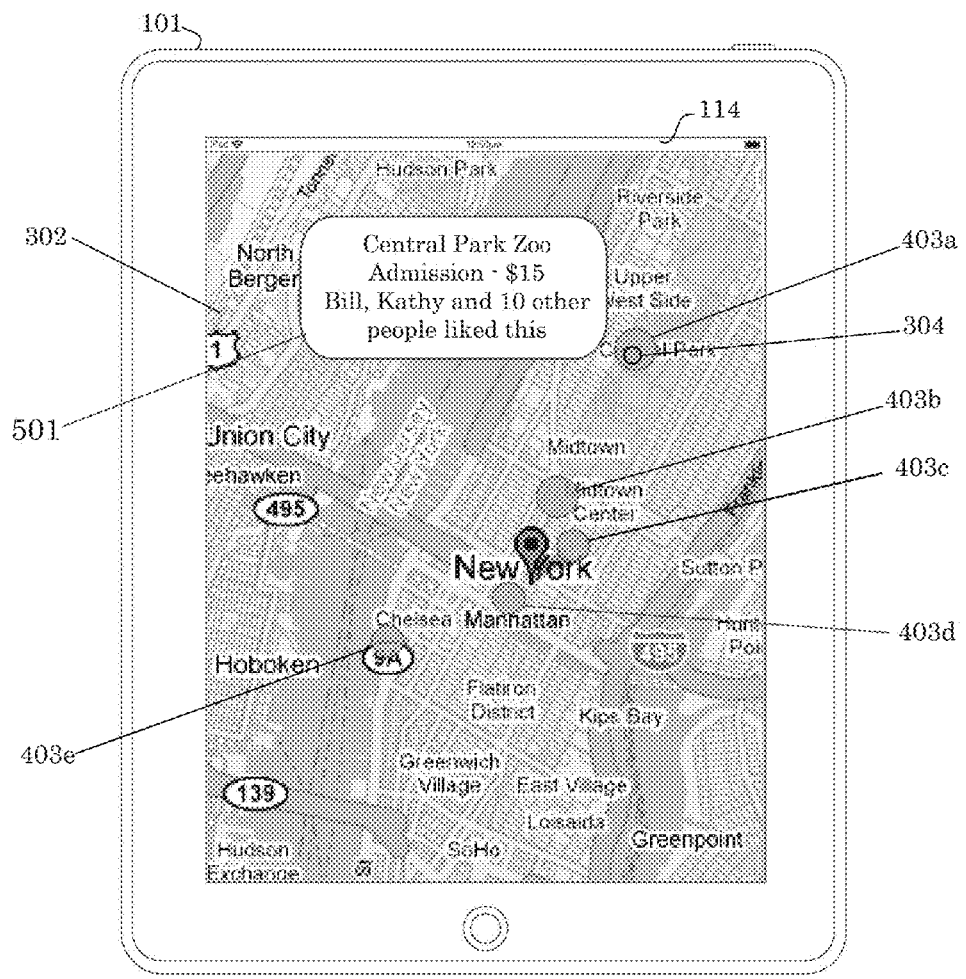
FIG. 5 illustrates an embodiment of the mapping interface of FIG. 3 displaying an embodiment of a notification of a prioritized geofence.

Referring to the example in FIG. 5, in some embodiments of the geofence system 100, the client device 101 may display via the display device 114 a plurality of geofences 403. In some embodiments, the geofence management system 201 may incorporate the historical data used to prioritize the transmission of the geofences 403 to the client device. For example, in some embodiments, when a user activates a geofence by triggering the proper transition, such as entering, exiting or dwelling within the boundary of the geofence 403, a notification displayed by the geofences 403 may also display historical data as well. For example, in the exemplary embodiment of FIG. 5, the notification displayed by the geofence 403a displays not only the programmed notification for the transition that occurs, but also informs the user that the user's associates have visited the geofence, liked the geofence, rated the geofence, etc. As shown in the example, the user of the client device has moved the device location 304 to central park. Upon entering the central park geofence 403a, a notification 501 may be pushed to the client device 101 and displayed informing the user about the admission cost of the central park zoo. The geofence notification not only displays the pushed notification, but also an indicator that friends, family, relatives, co-workers and other associates of the user who may know the user from social media have visited or liked the geofence 403a. The number of associates who have interacted with geofence 403a may have contributed to the reasoning why the analytics module prioritized the transmission of the geofence 403a for display on the client device 101.

Figure 6:
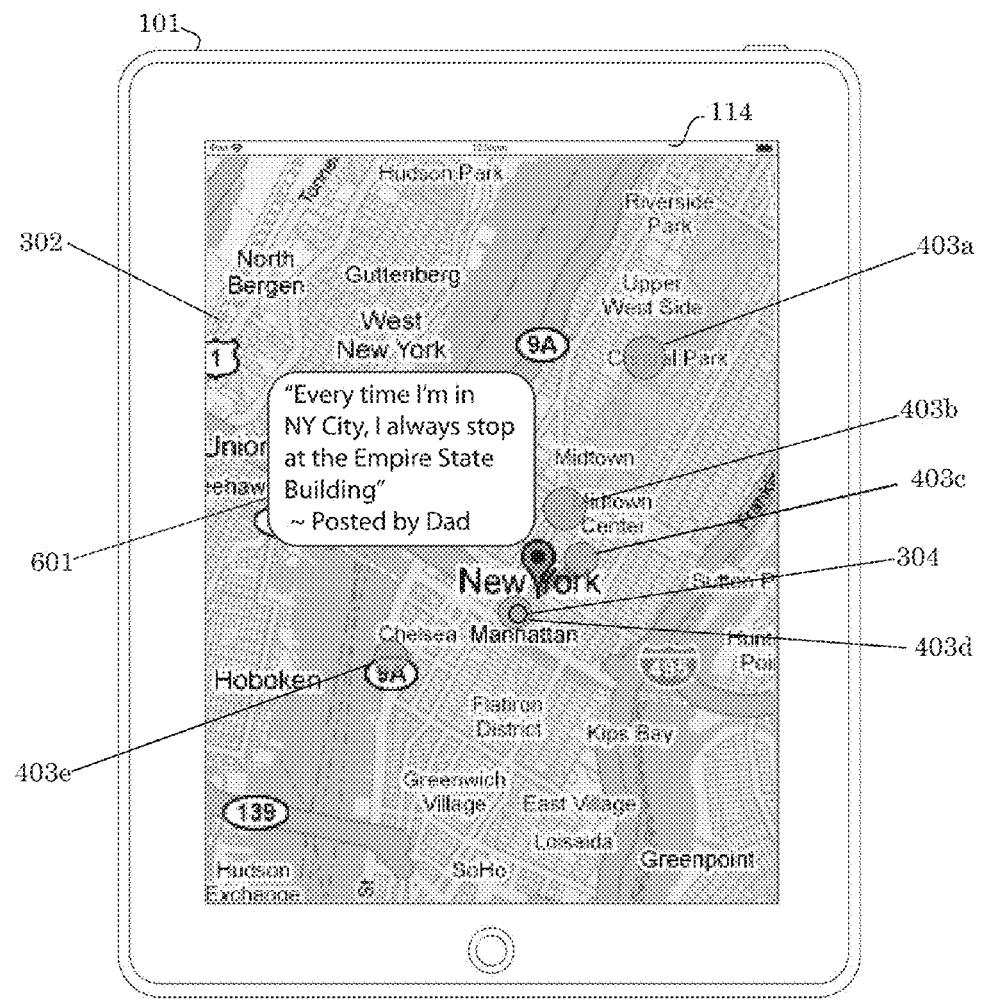
FIG. 6 illustrates an embodiment of the mapping interface of FIG. 3 displaying an alternative embodiment of a notification of a prioritized geofence.

In the alternative embodiment of FIG. 6, the pushed geofence notification 601 may not only display historical about associates who have liked or visited the geofence, but may also include notifications that associates have previously made discussing a particular geofence or location. For example, in the exemplary embodiment of FIG. 6, the analytics module 227 may have identified an associate of the user discussing or reviewing a location affiliated with a particular geofence. In the example, an associate of the user (the user's father) was identified discussing the empire state building and the historical data analyzed by the analytics module 227 may have identified the comment made. Likewise, upon transitioning into the empire state building geofence 403c, the server module 207 may deliver a notification that includes the messaging data collected in the historical data about the empire state building. As the user scrolls through the comments and notifications relevant to the geofence 403c, the user may be influenced to visit the empire state building is well.

Figure 7:
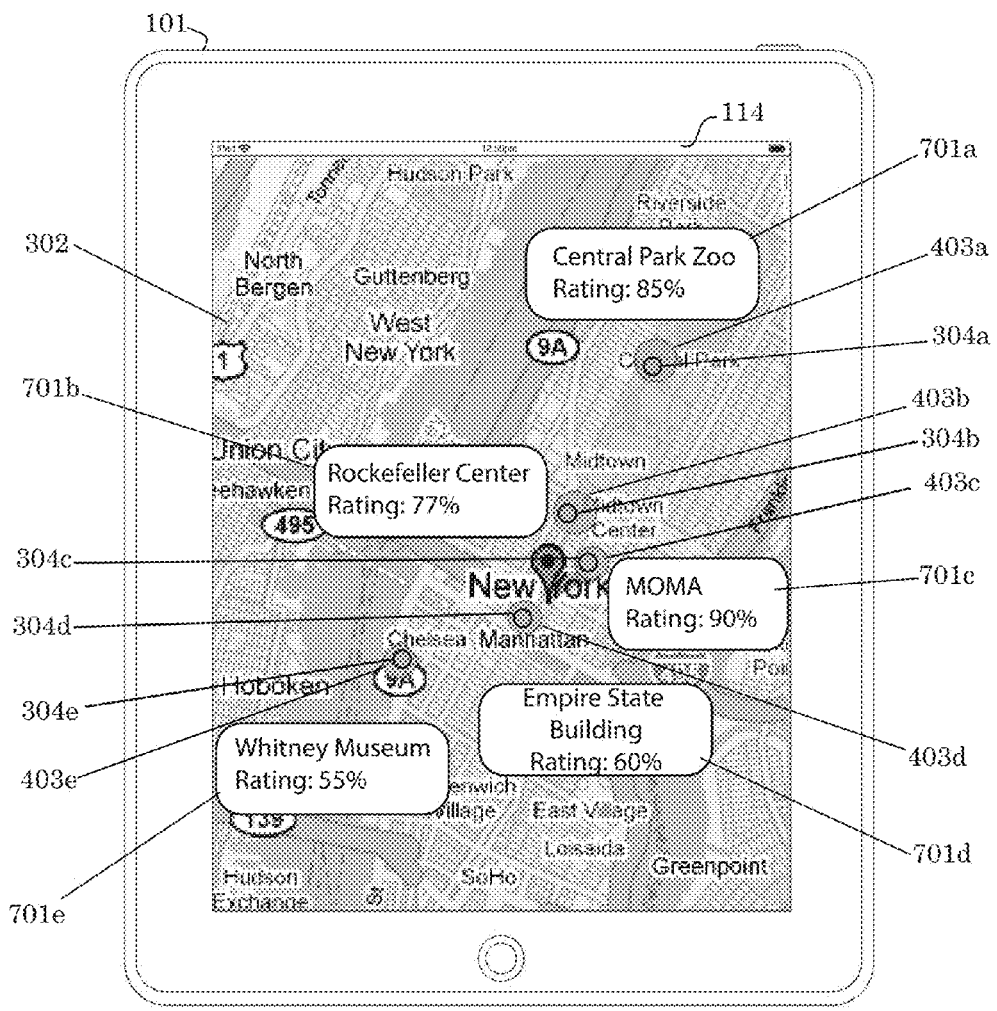
FIG. 7 illustrates an embodiment of the mapping interface of FIG. 3 displaying a plurality of prioritized geofence embodiments organized by rating.

Referring to the drawing of FIG. 7, the geofence system 100 in some embodiments may transmit and display a plurality of ratings determined by the analytics module 227 during the prioritization of the geofences 403. As shown in FIG. 7, the client device 101 may receive the prioritized geofences as a function of the relevancy, popularity and likelihood that the geofence 403 may be interesting to the user. As shown by the figures, in some embodiments, the display device 114 may display notifications 701a, 701b, 701c, 701d, 701e (hereinafter "notification 701") that disclose the ratings that prioritized the transmission of the geofence, when a client device has a device location 304a, 304b, 304c, 304d, 304e that impinges on a virtual barrier of the geofence or meets the transition requirements set by the geofence. The notifications may include a rating or favorability score indicating a high or lower level of popularity amongst the user's associates calculated by analyzing the data sources 121. For example, as shown by the FIG. 7, when the client device's 101 location 304 enters the geofence 403c which includes the museum of modern art (MOMA), a notification may be displayed by the client device 101 which includes the calculated rating of the MOMA. The MOMA may be considered highly popular amongst the associates of the user, as depicted by the rating of 90% in notification 701c, whereas comparatively, the Rockefeller Center geofence 403b may be considered less popular or relevant to the associates of the user, as indicated by the lower rating of 77% in the notification 701b that may be transmitted when the client device's 101 location 304b enters, exits or dwells within the geofence 403b. A user may find the displayed ratings to be a helpful guideline when determining whether to explore the geofence 403 locations or interact with the notifications pushed to the client device 101.

Method for Prioritizing Transmission of Geofences

Figure 8:
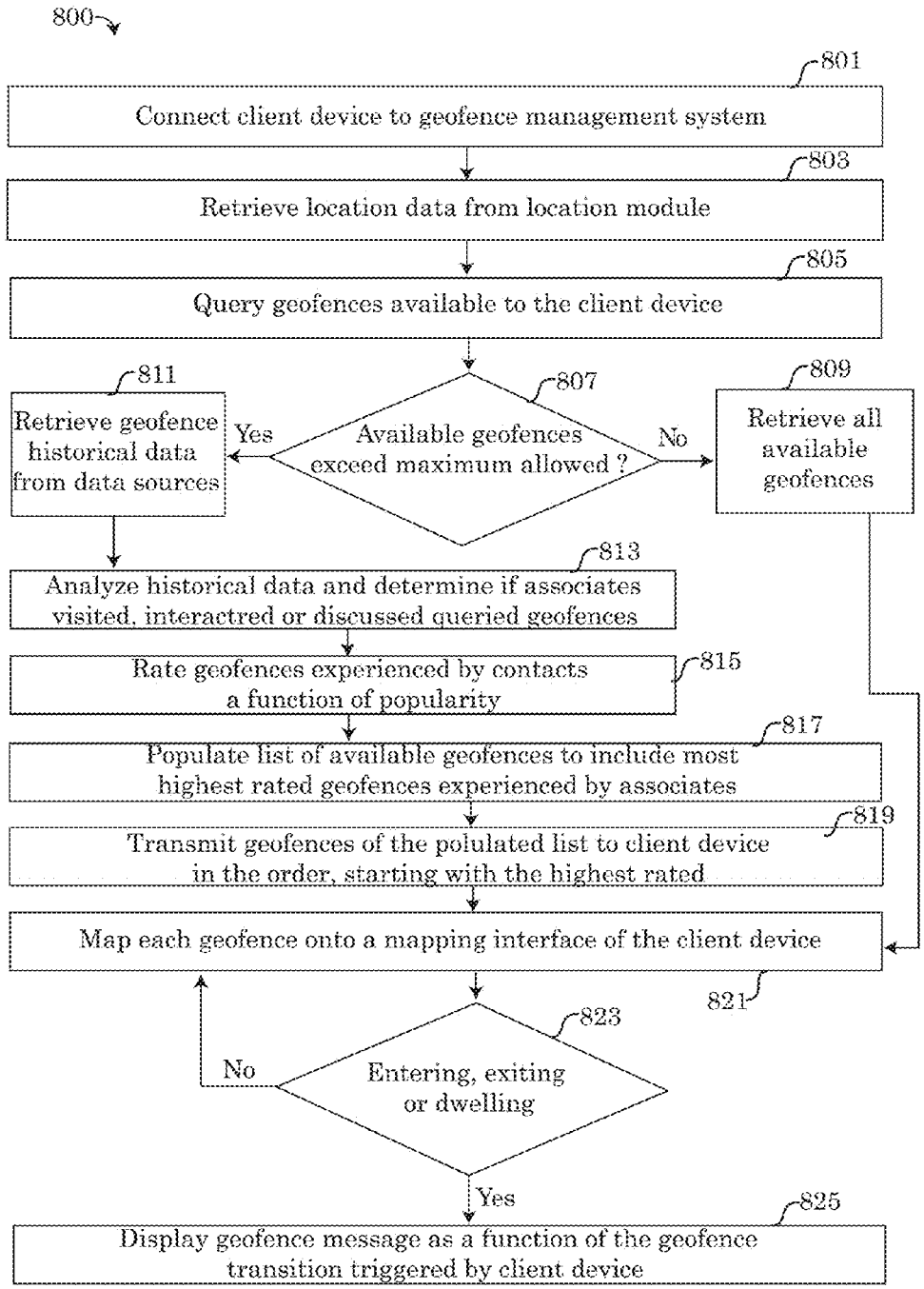
FIG. 8 depicts a flow chart describing an embodiment of a method for prioritizing transmission of a geofence.

The drawing of FIG. 8 represents an embodiment of a method or algorithm that may be implemented for prioritizing the transmission of geofences in accordance with the geofence systems 100 described in FIGS. 1-7 using one or more computers as defined generically in FIG. 9 below, and more specifically by the embodiments of specialized computer systems 101, 201 presented in FIGS. 1-7. A person skilled in the art should recognize that the steps of the algorithm described in FIG. 8 may be performed in a different order than presented by FIG. 8 and the algorithm may not require all of the steps described herein to be performed. Rather, some embodiments may prioritize the transmission of geofences using only one or more of the steps discussed below.

The embodiment of the method 800 for prioritizing the transmission of the geofences may begin at step 801. In step 801, the client device 101 may connect to a geofence management system 201 which may create and store a plurality of geofences accessible to the client device 101. The connection between the client device 101 and the geofence management system 201 may be facilitated over a computer network 120. In some embodiments, the method 800, the geofence management system 201 may perform step 803 and retrieve location data from the location module of the client device and subsequently in step 805 the geofence management system may query a plurality of geofences available for transmission to the client device 101 as a function of the location data. In this embodiment, the queried result may be limited to geofences within a predefined distance of the location of client device at the time the query is made. In alternative embodiments, the location of the client device may not have any impact on the query results being returned for the available geofences in step 805.

In step 807 of the method 800, a determination may be made by the geofence system 100 as to whether or not the number of available geofences returned by the query in step 805 would exceed the maximum number of geofences allowed to be simultaneously maintained or stored by the client device 101. If, the number of geofences returned by the query of available geofences in step 805 does not exceed the maximum number of geofences allowable by the client device 101, then in step 809, the client device may retrieve from the server module 207 all of the available geofences returned by the query.

Alternatively, if in step 807, the number of available geofences returned by the query in step 805 exceeds the maximum number of simultaneously active or stored geofences by the client device 101, the method 800 may proceed to prioritize the queried geofences. In step 811, the geofence management system 201 may retrieve historical data from one or more data sources 121 accessible over the network 120. The data may be collected, organized and stored by the analytics module 227, memory device 215, the geofence database 211, network repository 139 or any other memory storage device described herein or known by a person skilled in the art.

In step 813, the analytics module 227 of the geofence management system may analyze the historical data collected in step 811 and proceed to identify patterns and draw conclusions and perform statistical analysis. In some embodiments of step 813, the analytics module 227 may determine whether associates of the user have visited, commented on, discussed, rated, liked, shared or participated in any act that would indicate a positive or negative opinion of any of the queried geofences returned in step 805. The analytics module may proceed in step 815 to utilize the interactions and opinions of the associates of the user with the queried geofences to rate each of the geofences experienced or discussed by the associates of the user in the historical data collected. In some embodiments, the ratings assigned to each of the geofences may as a function of the popularity of the geofence in the historical data, which may be assess based on the frequency that a particular geofence is discussed or if the geofence is discussed by associates of the user that may be given more or less weight due to the relationship between the user and the associate.

In step 817, the analytics module may populate a list of prioritized geofences which may include the geofences listed in an organized order based on the ratings assigned in step 815. For example, the ratings ordering of the geofences may be made to organize the geofence by the most popular, most relevant to the user's or associates interests, or the geofences most probable to align with the interests of the user based on the historical data analyzed of the user's associates who may have visited, commented, interacted with, rated or discussed previously in the past. The list populated by the geofence management system may indicate the order in which geofences may be transmitted to the client device 101. In step 819, the geofences may be transmitted to the client device in the order of the list populated by the analytics module. The server module 207 may transmit the geofence data over the network 120 starting with the highest rated geofence available according to the query of step 805. The server module 207 may continue to transmit the geofences over the network 120, to the client device 101, in the order of the list populated in step 817, until instructed to cease transmitting or the maximum number of allowable geofences have been reached by the client device 101.

In step 821, each of the geofences transmitted to the client device 101 may be mapped onto a map interface 302 by the mapping module 107 as shown by the embodiments of FIG. 3-7. The mapping module 107 may be periodically updated by server module 207. As the server module 207 updates the list of prioritized geofences in the list populated in step 817, the mapping module 107 may reflect the changes to the prioritized list on the map interface 302 by adding new geofences and removing geofences with the lowest rating. Moreover, as the location module 105 is updated with location data, the mapping module 107 may track the position of the device location 304 and plot the device location onto the map interface 302. In some embodiments, the step of mapping each of the geofences in step 821 may further include mapping onto the map interface 302 one or more rating indicators identifying the highest rated and lowest rated geofences of the prioritized geofence list, as determined by the analytics module 227.

In step 823 of method 800, the geofence system may continue to track the client device's location 304 in relation to each of the geofences mapped in step 821. Tracking the device location may be performed by the tracking module 229 of the geofence management system 201 in some embodiments. In alternative embodiments, the client device 101 may locally store location data 205 retrieved from the location module 105. The mapping module 107 may compare the location data 205 to the location information designated by the geofences retrieved from the server module 207. Embodiments of the geofence system 100 may compare the geofence's location information and the device location 304. In step 823 of the method, a determination may be made by the system 100 regarding whether or not the client device has entered, exited or dwelled within the virtual boundaries of a geofence mapped to the map interface 304 in step 821.

If the conditions of one or more transitions in step 823 have not been satisfied by the client device, the geofence system 100 may continue to track the device location 304 and continuously map geofences to the map interface as the prioritized geofences are received from the server module 207. However, if in step 823, a transition of entering, exiting or dwelling has been met by the location data 205 of the client device 101, the method 800 may perform the action of step 825. In step 825, the client device may receive and display a geofence notification as a function of the geofence transition performed by the client device 101. For example, if, in step 825, the client device has entered the MOMA geofence 403c, a customized notification that is particular to the MOMA geofence 403c may be displayed on the display device 114 of the client device. The notification displayed in step 825 may include information about the geofence, landmarks and locations as well as information about the prioritization of the geofence, including but not limited to the geofence's rating, associates who may have visited or indicated that the associate likes the particular geofence as well as quotes, comments and reviews of the geofence by associates that may have been part of the historical data used to rate and prioritize the geofences.

Computer System

Referring to the drawings, FIG. 9 illustrates a block diagram of a computer system 900 that may be included in the systems of FIGS. 1-7 and for implementing methods for prioritizing transmission of geofences as shown in the embodiment of FIG. 8 and in accordance with the embodiments described in the present disclosure. The computer system 900 may generally comprise a processor 991, otherwise referred to as a central processing unit (CPU), an input device 992 coupled to the processor 991, an output device 993 coupled to the processor 991, and memory devices 994 and 995 each coupled to the processor 991. The input device 992, output device 993 and memory devices 994, 995 may each be coupled to the processor 991 via a bus. Processor 991 may perform computations and control the functions of computer 900, including executing instructions included in the computer code 997 for tools and programs for prioritizing the transmission of geofences, in the manner prescribed by the embodiments of the disclosure using the systems of FIGS. 1-7, wherein the instructions of the computer code 997 may be executed by processor 991 via memory device 995. The computer code 997 may include software or program instructions that may implement one or more algorithms for implementing the methods for prioritizing the transmission of geofences, as described in detail above. The processor 991 executes the computer code 997. Processor 991 may include a single processing unit, or may be distributed across one or more processing units in one or more locations (e.g., on a client and server).

The memory device 994 may include input data 996. The input data 996 includes any inputs required by the computer code 997. The output device 993 displays output from the computer code 997. Either or both memory devices 994 and 995 may be used as a computer usable storage medium (or program storage device) having a computer readable program embodied therein and/or having other data stored therein, wherein the computer readable program comprises the computer code 997. Generally, a computer program product (or, alternatively, an article of manufacture) of the computer system 900 may comprise said computer usable storage medium (or said program storage device).

Memory devices 994, 995 include any known computer readable storage medium, including those described in detail below. In one embodiment, cache memory elements of memory devices 994, 995 may provide temporary storage of at least some program code (e.g., computer code 997) in order to reduce the number of times code must be retrieved from bulk storage while instructions of the computer code 997 are executed. Moreover, similar to processor 991, memory devices 994, 995 may reside at a single physical location, including one or more types of data storage, or be distributed across a plurality of physical systems in various forms. Further, memory devices 994, 995 can include data distributed across, for example, a local area network (LAN) or a wide area network (WAN). Further, memory devices 994, 995 may include an operating system (not shown) and may include other systems not shown in the figures.

In some embodiments, the computer system 900 may further be coupled to an Input/output (I/O) interface and a computer data storage unit (for example a data store, data mart or repository). An I/O interface may include any system for exchanging information to or from an input device 992 or output device 993. The input device 992 may be, inter alia, a keyboard, a mouse, sensors, biometric input device, camera, timer, etc. The output device 993 may be, inter alia, a printer, a plotter, a display device (such as a computer screen or monitor), a magnetic tape, a removable hard disk, a floppy disk, etc. The memory devices 994 and 995 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 900, and may include any type of transmission link, including electrical, optical, wireless, etc.

An I/O interface may allow computer system 900 to store information (e.g., data or program instructions such as program code 997) on and retrieve the information from a computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk).

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that creates dynamic geofences, to deploy or integrate computing infrastructure with respect to prioritizing the transmission of geofences. Thus, an embodiment of the present invention discloses a process for supporting computer infrastructure, where the process includes providing at least one support service for at least one of integrating, hosting, maintaining and deploying computer-readable code (e.g., program code 997) in a computer system (e.g., computer 900) including one or more processor(s) 991, wherein the processor(s) carry out instructions contained in the computer code 997 causing the computer system to implement dynamic geofences. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method of prioritizing the transmission of geofences. Thus the present invention discloses a process for supporting, deploying and/or integrating computer infrastructure, integrating, hosting, maintaining, and deploying computer-readable code into the computer system 900, wherein the code in combination with the computer system 900 is capable of performing a method of prioritizing the transmission of geofences.

A computer program product of the present invention comprises one or more computer readable hardware storage devices having computer readable program code stored therein, said program code containing instructions executable by one or more processors of a computer system to implement the methods of the present invention.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for prioritizing transmission of a geofence comprising the steps of:
   querying, by a processor of a computer system, a list of each available geofence;
   calculating, by the processor, a number of available geofences returned by the list of each available geofence, wherein the number of available geofences returned by the querying step is more than a maximum number of active geofences permitted by a client device;
   retrieving, by the processor, historical data from one or more data sources;
   analyzing, by the processor, the historical data for positive or negative opinions of each available geofence using a sentiment analysis of messages for keywords, location tags and time stamps describing previous interactions between associates of a user and each of the available geofences;

populating, by the processor, a prioritized list of geofences from the list of each available geofence as a function of the sentiment analysis of messages for keywords, location tags, time stamps, wherein each of the geofences in the prioritized list are assigned a rating as a function of the analysis of the historical data and each of the geofences are prioritized by rating, wherein highest rated geofences are prioritized first;

weighting, by the processor, the rating of each geofence in the prioritized list of geofences as a function of a relationship between the associate of the user and the user; and transmitting, by the processor, each of the geofences in order by the rating to the client device up to a maximum number of allowable geofences permitted by the client device.

2. The method of claim 1, further comprising the steps of:
receiving, by the client device, each of the geofences of the prioritized list;
mapping, by the client device, each of the geofences to a mapping interface; and
displaying, by the client device, a notification as the user triggers a geofence event associated with each of the geofences.

3. The method of claim 2, wherein the step of displaying the notification as the user triggers the geofence event further includes displaying the rating of each of the geofences on the mapping interface.

4. The method of claim 2, wherein the step of displaying the notification as the user triggers the geofence event further comprises displaying within the notification, an indicator describing each of the associates of the user that have previously interacted with the geofence.

5. The method of claim 2, wherein the step of displaying the notification as the user triggers the geofence event further comprises:
displaying, by the client device, a message stored as part of the historical data written by associates of the user about at least one geofence of the prioritized list.

6. The method of claim 1, wherein the one or more data sources include social media data, email data, short message service (SMS) data, direct messaging data.

7. The method of claim 6, wherein the step of analyzing the historical data identifies associates of the user that have triggered a geofence event within each of the available geofences, associates that have provided a location tag on social media corresponding to one or more of the available geofences or associates that have posted messages comprising keywords associated with one or more of the available geofences.

8. The method of claim 1, further comprising providing at least one support service for at least one of creating, integrating, hosting, maintaining, and deploying computer-readable program code in a computer system, where the computer-readable program code in combination with the computer system is configured to implement the steps of querying, retrieving, analyzing, populating and transmitting.

9. A computer system, comprising:
a central processing unit (CPU);
a memory device coupled to the CPU;
a client device placed into electronic communication with the CPU; and
a computer readable storage device coupled to the processor, wherein the storage device contains program code executable by the CPU via the memory device to implement a method for prioritizing transmission of a geofence comprising the steps of:

querying, by the CPU, a list of each available geofence;
calculating, by the CPU, a number of available geofences returned by the list of each available geofence, wherein the number of available geofences returned by the querying step is more than a maximum number of active geofences permitted by a client device;
retrieving, by the CPU, historical data from one or more data sources;
analyzing, by the CPU, the historical data for positive or negative opinions of each available geofence using a sentiment analysis of messages for keywords, location tags and time stamps describing previous interactions between associates of a user and each of the available geofences;
populating, by the CPU, a prioritized list of geofences from the list of each available geofence as a function of the sentiment analysis of messages for keywords, location tags, time stamps, wherein each of the geofences in the prioritized list are assigned a rating as a function of the analysis of the historical data and each of the geofences are prioritized by rating, wherein highest rated geofences are prioritized first;
weighting, by the CPU, the rating of each geofence in the prioritized list of geofences as a function of a relationship between the associate of the user and the user; and
transmitting, by the CPU, each of the geofences in order by the rating to the client device up to a maximum number of allowable geofences permitted by the client device.

10. The system of claim 9, further comprising:
receiving, by the client device, each of the geofences of the prioritized list;
mapping, by the client device, each of the geofences to a mapping interface; and
displaying, by the client device, a notification as the user triggers a geofence event associated with each of the geofences.

11. The system of claim 10, wherein the step of displaying the notification as the user triggers the geofence event further includes displaying the rating of each of the geofences on the mapping interface.

12. The system of claim 10, wherein the step of displaying the notification as the user triggers the geofence event further comprises displaying within the notification, an indicator describing each of the associates of the user that have previously interacted with the geofence.

13. The system of claim 10, wherein the step of displaying the notification as the user triggers the geofence event further comprises:
displaying, by the client device, a message stored as part of the historical data written by associates of the user about at least one geofence of the prioritized list.

14. The system of claim 9, wherein the one or more data sources include social media data, email data, short message service (SMS) data, direct messaging data.

15. A computer program product comprising:
one or more computer readable hardware storage devices having computer readable program code stored therein, said program code containing instructions executable by the one or more central processing units (CPU) to implement a method for prioritizing transmission of a geofence comprising the steps of:
querying, by the CPU, a list of each available geofence to a client device operated by a user;

calculating, by the CPU, a number of available geofences returned by the list of each available geofence, wherein the number of available geofences returned by the querying step is more than a maximum number of active geofences permitted by a client device;

retrieving, by the CPU, historical data from one or more data sources;

analyzing, by the CPU, the historical data for positive or negative opinions of each available geofence using a sentiment analysis of messages for keywords, location tags and time stamps describing previous interactions between associates of the user and each of the available geofences;

populating, by the CPU, a prioritized list of geofences from the list of each available geofence as a function of the sentiment analysis of messages for keywords, location tags, time stamps, wherein each of the geofences in the prioritized list are assigned a rating as a function of the analysis of the historical data and each of the geofences are prioritized by rating, wherein highest rated geofences are prioritized first;

weighting, by the CPU, the rating of each geofence in the prioritized list of geofences as a function of a relationship between the associate of the user and the user; and transmitting, by the CPU, each of the geofences in order by rating to the client device up to a maximum number of allowable geofences permitted by the client device.

16. The computer program product of claim 15, further comprising the steps of:

receiving, by the client device, each of the geofences of the prioritized list;

mapping, by the client device, each of the geofences to a mapping interface; and displaying, by the client device, each of the geofences.

17. The computer program product of claim 16, wherein the step of displaying the notification as the user triggers the geofence event further includes displaying the rating of each of the geofences on the mapping interface.

18. The computer program product of claim 16, wherein the step of displaying the notification as the user triggers the geofence event further comprises displaying within the notification, an indicator describing each of the associates of the user that have previously interacted with the geofence.

19. The computer program product of claim 16, wherein the step of displaying the notification as the user triggers the geofence event further comprises:

displaying, by the client device, a message stored as part of the historical data written by associates of the user about at least one geofence of the prioritized list.

20. The computer program product of claim 15, wherein the step of analyzing the historical data identifies associates of the user that have triggered a geofence event within each of the available geofences, associates that have provided a location tag on social media corresponding to one or more of the available geofences or associates that have posted messages comprising keywords associated with one or more of the available geofences.

* * * * *